US011416482B2

(12) United States Patent
Gabbai et al.

(10) Patent No.: US 11,416,482 B2
(45) Date of Patent: *Aug. 16, 2022

(54) ADAPTIVE SEARCH REFINEMENT

(71) Applicant: eBay Inc., San Jose, CA (US)

(72) Inventors: Jonathan Gabbai, London (GB); James Tenniswood, London (GB); Nandita Chakravarti, San Jose, CA (US)

(73) Assignee: eBay Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/063,454

(22) Filed: Oct. 5, 2020

(65) Prior Publication Data
US 2021/0019659 A1   Jan. 21, 2021

Related U.S. Application Data

(63) Continuation of application No. 15/974,040, filed on May 8, 2018, now Pat. No. 10,803,406, which is a
(Continued)

(51) Int. Cl.
*G06F 15/16* (2006.01)
*G06F 16/2453* (2019.01)
(Continued)

(52) U.S. Cl.
CPC .......... *G06F 16/2453* (2019.01); *G06F 3/048* (2013.01); *G06F 16/248* (2019.01);
(Continued)

(58) Field of Classification Search
CPC .. G06F 16/2453; G06F 3/048; G06F 16/2425; G06F 16/248; G06F 16/26; G06F 16/9535; G06N 20/00; G06Q 30/0641
(Continued)

(56) References Cited

U.S. PATENT DOCUMENTS 6,701,311 B2   3/2004   Biebesheimer et al.
6,748,376 B1   6/2004   Beall et al.
(Continued)

FOREIGN PATENT DOCUMENTS

WO   2017/007538 A1   1/2017

OTHER PUBLICATIONS

Corrected Notice of Allowability Received for U.S. Appl. No. 14/793,342 dated Apr. 5, 2018, 2 pages.
(Continued)

*Primary Examiner* — Alex Gofman
(74) *Attorney, Agent, or Firm* — Holland & Hart LLP

(57) ABSTRACT

A computer-implemented method for adaptive search refinement is provided. The method may include obtaining an indication of user engagement with an online marketplace and in response to obtaining the indication, providing visually guided search refinement to construct a search query for searching the online marketplace. Providing the visually guided search refinement may include providing search refinement options, obtaining an indication of the approval or disapproval of one or more of the search refinement options, and repeating providing the search refinement options and receiving the indication. For each iteration of providing the plurality of search refinement options, at least some of the search refinement options may be different and determined based on previously received indications of both approval and disapproval. The method for adaptive search refinement may further include providing search results based on the search query.

20 Claims, 6 Drawing Sheets

Related U.S. Application Data continuation of application No. 14/793,342, filed on Jul. 7, 2015, now Pat. No. 9,990,589.

(51) Int. Cl.
| | |
|---|---|
| *G06N 20/00* | (2019.01) |
| *G06F 16/26* | (2019.01) |
| *G06F 16/248* | (2019.01) |
| *G06F 16/242* | (2019.01) |
| *G06F 16/9535* | (2019.01) |
| *G06Q 30/06* | (2012.01) |
| *G06F 3/048* | (2013.01) |

(52) U.S. Cl.
CPC .......... *G06F 16/2425* (2019.01); *G06F 16/26* (2019.01); *G06F 16/9535* (2019.01); *G06N 20/00* (2019.01); *G06Q 30/0641* (2013.01)

(58) Field of Classification Search
USPC ........................................................ 707/722
See application file for complete search history.

(56) References Cited

U.S. PATENT DOCUMENTS

| | | | |
|---|---|---|---|
| 7,792,821 B2 | 9/2010 | Shakib et al. | |
| 8,176,440 B2 | 5/2012 | Stading | |
| 8,577,911 B1 * | 11/2013 | Stepinski | G06F 16/3328 707/765 |
| 8,595,651 B2 | 11/2013 | Kenemer et al. | |
| 8,631,029 B1 | 1/2014 | Amacker | |
| 8,713,064 B1 | 4/2014 | Khafizov et al. | |
| 8,793,249 B2 | 7/2014 | Lai et al. | |
| 8,965,882 B1 | 2/2015 | Popovic et al. | |
| 9,990,589 B2 * | 6/2018 | Gabbai | G06Q 30/0641 |
| 10,803,406 B2 * | 10/2020 | Gabbai | G06N 20/00 |
| 2002/0107842 A1 | 8/2002 | Biebesheimer et al. | |
| 2006/0026147 A1 | 2/2006 | Cone et al. | |
| 2007/0260595 A1 | 11/2007 | Beatty et al. | |
| 2008/0005118 A1 * | 1/2008 | Shakib | G06F 16/951 |
| 2008/0319975 A1 | 12/2008 | Morris et al. | |
| 2010/0079781 A1 * | 4/2010 | Yamamoto | H04N 1/2179 358/1.13 |
| 2010/0100541 A1 * | 4/2010 | Tsuzuki | G06F 16/3322 707/730 |
| 2010/0114908 A1 | 5/2010 | Chand et al. | |
| 2010/0146012 A1 | 6/2010 | Beaudreau et al. | |
| 2011/0191326 A1 | 8/2011 | Gutlapalli et al. | |
| 2011/0191333 A1 | 8/2011 | Gutlapalli et al. | |
| 2011/0276581 A1 | 11/2011 | Levinsky | |
| 2011/0320444 A1 | 12/2011 | Yehaskel et al. | |
| 2012/0174023 A1 | 7/2012 | Kenemer et al. | |
| 2013/0085900 A1 | 4/2013 | Williams | |
| 2013/0097173 A1 | 4/2013 | Stovicek et al. | |
| 2013/0110802 A1 * | 5/2013 | Shenoy | G06F 16/955 707/706 |
| 2013/0297453 A1 | 11/2013 | Racco | |
| 2014/0270498 A1 | 9/2014 | Chester et al. | |
| 2014/0279246 A1 | 9/2014 | Chen et al. | |
| 2015/0006505 A1 | 1/2015 | Plakhov et al. | |
| 2015/0154685 A1 | 6/2015 | Pope et al. | |
| 2015/0324433 A1 | 11/2015 | Duffy et al. | |
| 2016/0162583 A1 | 6/2016 | Maddocks | |
| 2016/0179877 A1 * | 6/2016 | Koerner | G06F 16/90324 707/721 |
| 2017/0011136 A1 | 1/2017 | Gabbai et al. | |
| 2018/0260738 A1 | 9/2018 | Gabbai et al. | |

OTHER PUBLICATIONS

Non-Final Office Action received for U.S. Appl. No. 14/793,342, dated Sep. 8, 2017, 17 pages.
Notice of Allowance received for U.S. Appl. No. 14/793,342 dated Feb. 1, 2018, 18 pages.
Response to Non-Final Office Action filed on Dec. 7, 2017 for U.S. Appl. No. 14/793,342 dated Sep. 8, 2017, 20 pages.
Final Office Action Received for U.S. Appl. No. 15/974,040, dated Jan. 31, 2020, 11 pages.
Non-Final Office Action Received for U.S. Appl. No. 15/974,040, dated Aug. 21, 2019, 10 Pages.
Notice of Allowance received for U.S. Appl. No. 15/974,040, dated Jun. 10, 2020, 11 pages.
Response to Final Office Action filed on Apr. 27, 2020 for U.S. Appl. No. 15/974,040, dated Jan. 31, 2020, 12 pages.
Response to Non-Final Office Action filed on Nov. 19, 2019 for U.S. Appl. No. 15/974,040 dated Aug. 21, 2019, 13 pages.
International Preliminary Report on Patentability received for PCT Application No. PCT/US2016/034426, dated Jan. 18, 2018, 8 pages.
International Search Report received for PCT Patent Application No. PCT/US2016/034426 dated Aug. 31, 2016, 2 pages.
International Written Opinion received for PCT Patent Application No. PCT/US2016/034426 dated Aug. 31, 2016, 6 pages.

* cited by examiner

ADAPTIVE SEARCH REFINEMENT

CROSS-REFERENCE TO RELATED APPLICATIONS

This application is a continuation of U.S. patent application Ser. No. 15/974,040 by Gabbai et al., entitled "Adaptive Search Refinement," and filed on May 8, 2018; which is a continuation of U.S. patent application Ser. No. 14/793,342 by Gabbai et al., entitled "Adaptive Search Refinement," filed on Jul. 7, 2015, now U.S. Pat. No. 9,990,589 issued on Jun. 5, 2018; each of which is hereby incorporated by reference in its entirety.

FIELD

The embodiments discussed herein are related to adaptive search refinement.

BACKGROUND

As an ever-increasing amount of information is being made available electronically, typically over networks such as the Internet, it is increasingly difficult to locate information or other content that may be of interest to a user. Many systems may utilize search engines that accept keywords or other types of queries from a user, and return results related to the query. Oftentimes users do not enter precise queries, which may result in the set of results being over-inclusive, forcing the user to navigate through many search results before locating the items of interest. Such an approach may result in a significant amount of wasted time or frustration on the part of the user. For content providers who offer items for consumption, such as products offered through an electronic marketplace, this frustration may prevent a customer from quickly locating products of interest, which may result in lost sales and lesser repeat business.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
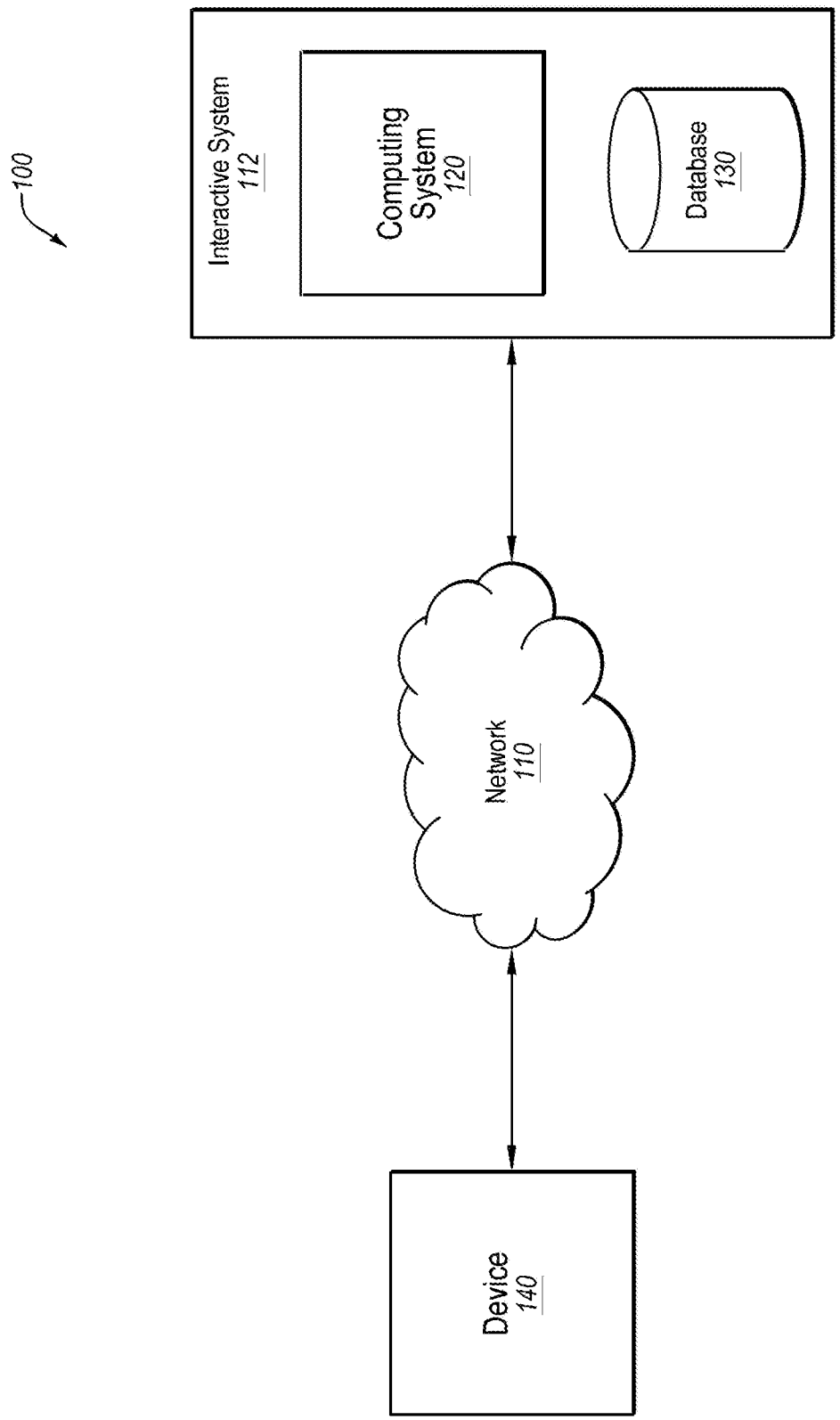
FIG. 1 illustrates an example system configured to perform adaptive search refinement.

In some circumstances, an interactive system may include information of interest to a user. For example, the interactive system may be an online marketplace or an information database, among other types of user interactive systems. In some embodiments of the present disclosure, the interactive system may be configured to provide adaptive search refinement to assist a user to identify material of interest.

Some embodiments herein relate to a computer-implemented method for adaptive search refinement. In some embodiments, the method may include obtaining a first search query and comparing a level of specificity of the first search query to a search threshold. When the level of specificity is below the search threshold, the method may include providing visually guided search refinement to construct a second search query. The visually guided search refinement may be provided instead of search results for the first search query. In some embodiments, providing the visually guided search refinement may include providing multiple search refinement options. In some embodiments, each of the search refinement options may include an image visually illustrating a search refinement category and being configured to be approved or disapproved. Providing the visually guided search refinement may also include obtaining an indication of the approval or the disapproval of one or more of the multiple search refinement options and repeating providing the multiple search refinement options and receiving the indication. In these and other embodiments, for each iteration of providing the multiple search refinement options, at least some of the multiple search refinement options are different and determined based on previously received indications of both approval and disapproval. The method of adaptive search refinement may also include providing search results based on the second search query.

Some embodiments herein also relate to another computer implemented method for adaptive search refinement. In some embodiments, the method may include obtaining an indication of user engagement with an online marketplace and providing visually guided search refinement to construct a search query for searching the online marketplace. In some embodiments, the visually guided search refinement may include providing multiple search refinement options. In some embodiments, each of the search refinement options may include an image visually illustrating a search refinement category and being configured to be approved or disapproved. The visually guided search refinement may further include obtaining an indication of the approval or disapproval of one or more of the multiple search refinement options and repeating providing the multiple search refinement options and receiving the indication. In some embodiments, for each iteration of providing the multiple search refinement options, at least some of the multiple search refinement options are different and determined based on previously received indications of both approval and disapproval. The method of adaptive search refinement may also include providing search results based on the search query.

Turning to the figures, FIG. 1 illustrates an example system 100 configured to perform adaptive search refinement. The system 100 may be arranged in accordance with at least one embodiment described in the present disclosure. The system 100 may include a network 110, an interactive system 112 that includes a computing system 120, a database 130, and a device 140.

The network 110 may be configured to communicatively couple the interactive system 112 with the device 140. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

The device 140 may be any electronic device configured to provide a user with access to one or more systems, which may include one or more servers and databases, through a network. For example, the device 140 may include a desktop computer, a laptop computer, a smartphone, a mobile phone, a tablet computer, or any other processing device configured to access information over a network.

In some embodiments, the interactive system 112 may be any configuration of hardware, such as servers and databases, that are networked together and configured to perform a task. In some embodiments, the computing system 120 may be a single computing system that includes one or more processors and memory, such as a server or some other computing system, within the interactive system 112. Alternately or additionally, the computing system 120 may include multiple computing systems, such as multiple servers, that are networked together and configured to perform a task within the interactive system 112. Alternately or additionally, the computing system 120 may include computing systems and/or computer-readable-instructions that are configured to be executed by the interactive system 112 to perform the operations described in this disclosure. The database 130 may be any configuration of digital data storage.

In some embodiments, the interactive system 112 may be configured to provide a user, through the device 140, with an ability to browse or search for information, services, or goods listed or included within the database 130 of the interactive system 112.

For example, the interactive system 112 may be configured as an online marketplace for a seller or sellers to sell goods to buyers. In these and other embodiments, the database 130 may include listings of goods to be sold that may be accessed by a user through a device, such as the device 140. In some embodiments, the interactive system 112 may allow the device 140 to browse through the listings of goods or search for particular types of goods.

Alternately or additionally, the interactive system 112 may be configured as an information system that allows a user through a device, such as the device 140, to access information in the interactive system 112. In these and other embodiments, the database 130 may include the information that may be accessed by the device 140. In some embodiments, the interactive system 112 may allow the device 140 to browse through the information or search for particular types of information.

In some embodiments, the computing system 120 may be configured to provide visually guided search refinement for the user as the user browses or searches for particular information, services, or goods listed or included within the database 130. In some embodiments, visually guided search refinement may provide a user with one or more visually oriented search refinement options. For example, the computing system 120 may provide computer-readable instructions over the network 110 to the device 140. The device 140, through a web browser or some other program may render the computer-readable instructions to present the visually oriented search refinement options to a user through the device 140. In this disclosure, the interactive system 112 or computing system 120 providing visually oriented search refinement options or other configurations may include providing computer-readable instructions that when executed result in the oriented search refinement options over the network 110 as described.

In some embodiments, the visually oriented search refinement options may be provided to a user in place of search results in response to an obtained search query. Alternately or additionally, the visually oriented search refinement options may be provided based on an indication of user engagement with the interactive system 112. For example, when the interactive system 112 is a website and the user is browsing a landing webpage or some other webpage, the computing system 120 may provide visually oriented search refinement options based on the user engagement with the landing webpage.

In some embodiments, each of the visually oriented search refinement options may relate to a particular search refinement category or may be a particular good, service, or information. In some embodiments, some of the visually oriented search refinement options may include an image visually illustrating a search refinement category. Alternately or additionally, some of the visually oriented search refinement options may include an image visually illustrating a search refinement category along with a description of the search refinement category.

In some embodiments, a search refinement category may be any category that may be used to group or categorize goods, services, or information provided by the interactive system 112. For example, some search refinement categories for services, goods, or information may include a product category, an aspect category, a brand category, a keyword category, and/or a constraint category, among other categories. The product category may relate to different types of services, goods, or information. For example, for a search related to insurance, the product category may relate to vehicle, home, life, health, and/or disability, among products of insurance. The aspect category may relate to different aspects of services, goods, or information. For example, for a search related to cars, the aspect category may relate to different colors of cars. As another example, for a search related to clothes, the aspect category may relate to styles of clothes or clothes trending in social media. The brand category may relate to different brands of services, goods, or information where the brands identify a manufacturer or retailer of the service or good or originator of the information.

The keyword category may relate to typical keywords that may be otherwise associated with particular services, goods, or information being browsed or searched. The constraint category may relate to constraints associated with services, goods, or information. For example for goods, the constraints may be associated with cost, warranty, reviews, size, shipping time, or time for delivery, among other constraints.

In some embodiments, when multiple visually oriented search refinement options are provided, each of the visually oriented search refinement options may be from a single search refinement category or from multiple different search refinement categories.

In some embodiments, the visually oriented search refinement options may be configured to be approved or disapproved of by a user. In these and other embodiments, the visually oriented search refinement options may be configured to receive an indication from a user of an approval or disapproval of the visually oriented search refinement options. For example, the visually oriented search refinement options may include a like and dislike option, such as a radial button or image that may be selected. Alternately or additionally, the visually oriented search refinement options may be approved or disapproved based on the selection. Selection of the visually oriented search refinement options may indicate approval of the visually oriented search refinement options while non-selection may indicate disapproval.

The computing system 120 may be configured to obtain an indication of an approval or disapproval of a user with respect to one or more of the visually oriented search refinement options provided to a user. For example, when the visually oriented search refinement options are provided in a web browser on the device 140 based on computer readable instructions, such as html provided to the device 140 from the interactive system 112 over the network 110. A user may indicate with an associated input device of the device 140, such as a mouse, keyboard, or touch screen, an approval or disapproval of one or more of the provided visually oriented search refinement options that are provided to the user. The received input may be processed by the web browser using the computer readable instructions provided by the interactive system 112 and provided to the computing system 120 over the network 110.

The computing system 120 may collect the approvals and/or disapprovals of the visually oriented search refinement options provided to a user. Based on the collection of approvals and/or disapprovals of the visually oriented search refinement options, the computing system 120 may construct a search query that may be used to search for information, services, or goods listed or included within the database 130.

In some embodiments, the computing system 120 may be configured to generate additional visually oriented search refinement options based on obtained indications of approval or disapproval of a user with respect to previously displayed visually oriented search refinement options. For example, the computing system 120 may be configured to display multiple visually oriented search refinement options as a first set of visually oriented search refinement options and to obtain approvals or disapprovals from a user for one or more of the visually oriented search refinement options in the first set. Based on the obtained approvals and disapprovals of the visually oriented search refinement options of the first set, the computing system 120 may generate a second set of visually oriented search refinement options. Each of the visually oriented search refinement options in the second set may be different from the visually oriented search refinement options in the first set or some of the visually oriented search refinement options may be the same in both the first and second sets.

In some embodiments, the computing system 120 may be configured to obtain an approval or disapproval for each of the visually oriented search refinement options in a first set before providing a second set or search results based on the approvals or disapprovals. Alternately or additionally, the computing system 120 may obtain one or more approvals or disapprovals for each of the visually oriented search refinement options in a set before providing a second set or search results based on the approvals or disapprovals. In some embodiments, the computing system 120 may assign weights to the approvals, disapprovals, and/or non-approvals for each of the visually oriented search refinement options. In these and other embodiments, non-approvals may be visually oriented search refinement options for which a user does not provide an approval or disapproval. For example, an approval of a visually oriented search refinement option may be weighted more than a non-approval, which may be weighted more than a disapproval when determining additional visually oriented search refinement options or generating a search query that results in search results that are provided to a user.

The computing system 120 may be configured to generate a search query based on the approvals, disapprovals, and/or non-approvals for provided visually oriented search refinement options. The computing system 120 may provide the search query to the interactive system 112. The interactive system 112 may conduct a search of the goods, services, or information stored in the database 130 using the search query. The search results may be provided to the device 140 over the network 110 for presentation to a user.

In some embodiments, the computing system 120 may be configured to continually provide different sets of visually oriented search refinement options until a particular threshold is met. For example, in some embodiments, the threshold may be a number of set of visually oriented search refinement options provided. Alternately or additionally, the threshold may be a length of a search query resulting from the approvals and disapprovals of the visually oriented search refinement options. Alternately or additionally, the threshold may be a level of specificity of a search query resulting from the approvals and disapprovals of the visually oriented search refinement options. Alternately or additionally, the threshold may be a confidence level that a search query resulting from the approvals and disapprovals of the visually oriented search refinement options may produce search results resulting in a conversion by a user. In some embodiments, the particular threshold may vary based on the goods, services, and/or information being considered, a user's past history, and/or among other factors.

In some embodiments, after the particular threshold is met, the computing system 120 may determine a search query and provide the search query to the interactive system 112. The interactive system 112 may search the database 130 with the search query and provide the resulting search results to the device 140. Alternately or additionally, the computing system 120 may search the database 130 with the search query and provide the search results to the device 140.

In some embodiments, the computing system 120 may determine the search query using approvals, disapprovals, and non-approvals of the visually oriented search refinement options. In some embodiments, the approvals, disapprovals, and non-approvals of the visually oriented search refinement options may be applied with an absolute interpretation. In these and other embodiments, the search query may be constructed based on the approvals and disapprovals of the visually oriented search refinement options. For example, the search query may be constructed to include the approved visually oriented search refinement options and to not include disapproved visually oriented search refinement options or include the disapproved visually oriented search refinement options but indicate that the disapproved visually oriented search refinement options are disapproved. For example, for a search concerning cameras that includes the approval of SLR and Brand A and disapproval of compact cameras and Brand B, the search query may be "camera and SLR and Brand A" or the search query may be "camera and SLR and Brand A and NOT (compact cameras and Brand B)."

In some embodiments, the approvals, disapprovals, and non-approvals of the visually oriented search refinement options may be applied with a non-absolute interpretation. In some embodiments, the non-absolute interpretation may be referred to as a fuzzy interpretation of the approvals, disapprovals, and non-approvals of the visually oriented search refinement options. A search query based on a non-absolute interpretation may include or reject additional search terms than those directly associated with the provided visually oriented search refinement options.

For example, an approval of a visually oriented search refinement option associated with a brand of a car, such as a luxury brand of a car, under a non-absolute interpretation may result in the inclusion of the approved luxury brand and other luxury brands of cars. Alternately or additionally, the disapproval of a visually oriented search refinement option associated with a brand of a car, such as a luxury brand of a car, under a non-absolute interpretation may result in the non-inclusion of the disapproved luxury brand and other luxury brands of cars.

In some embodiments, a degree of the non-absolute interpretation used to construct the search query may vary. For example, when a user has indicated a strong preference with respect to particular information, services, or goods, through the approval, disapproval, or non-approval of provided visually oriented search refinement options, the non-absolute interpretation may be more strictly applied. In contrast, when a user has not indicated a strong preference with respect to particular information, services, or goods through the approval, disapproval, or non-approval of provided visually oriented search refinement options, the non-absolute interpretation may be less strictly applied.

In some embodiments, the degree of the non-absolute interpretation of the previously received indications of approval, non-approval, and disapproval is based on a number of approvals, non-approvals, and disapprovals of visually oriented search refinement options in a same search refinement category.

For example, a strong preference may be determined when there are approvals for similar search refinement options and no disapprovals or non-approvals for similar search refinement options. Alternately or additionally, a strong preference may be determined when there are disapprovals for similar search refinement options and no non-approvals or approvals for similar search refinement options. Alternately or additionally, a weak preference may be determined when there are various approvals and disapprovals in a similar search refinement option.

In some embodiments, a device 140 or a user through the device 140 may request for search results before the particular threshold is met. In these and other embodiments, the computing system 120 may generate a search query based on the previously received approvals, disapprovals, and non-approvals of previously presented visually oriented search refinement options. The generated search query may be used to search the database 130 and produce search results to provide to the device 140. In these and other embodiments, the device 140 or a user through the device 140 may toggle between receiving search results and visually oriented search refinement options. In these and other embodiments, when the search results and the visually oriented search refinement options are provided may be based on a request from the device 140 or user through the device 140 and not based on the particular threshold. In some embodiments, search results and the visually oriented search refinement options may be provided such that both are presented by the device 140 at the same time. In these and other embodiments, a change in an approval, disapproval, or non-approval of provided visually oriented search refinement options may result in a change to the search results provided to the device 140 and thus presented by the device 140.

An example of the operation of the system follows. A user may submit a first search query of "television" to the interactive system 112 by way of the device 140 and the network 110. The first search query may result in a level of specificity that is below a search threshold as determined by the computing system 120. The computing system 120 may provide the device 140 with a first search refinement options to present to the user. The first search refinement options may include options such as "LCD," "Plasma," "Smart TV," "4K," and "Curved." The user may approve of "LCD" and "Curved" and disapprove of "Plasma." The user may not approve or disapprove of "Smart TV," and "4K." Based on the approvals and disapprovals, the computing system 120 may generate a second search refinement options and provide the second search refinement options to the device 140 for presentation by the user.

The second search refinement options may include "Phillips," "Sony," "Samsung," "Size less than 60 inches," and "Size greater than 60 inches." The user may approve of "Sony," "Samsung," and "Size greater than 60 inches." The user's responses may be obtained by the computing system 120. Based on the user's response, the computing system 120 may determine a second search query that may result in a level of specificity that is above the search threshold. For example, the second search query may be "Curved LCD television of greater than 60 inches by Sony or Samsung or LG or Sharp but not Phillips." Note that the LG and Sharp may not have been a part of either of the first or second search refinement options. The LG and Sharp names in the second search request may have been a result of the computing system 120 applying a non-absolute interpretation of the approvals and disapprovals of the first or second search refinement options.

The computing system 120 may provide the second search query to the interactive system 112. The interactive system 112 may search the database 130 based on the second search query. The results of the second search query may be provided to the device 140 for presentation to the user. In this manner, the computing system 120 may provide visually guided search refinement for the user.

Generally, on-line marketplaces include an enormous number of listings of items. For example, an on-line marketplace may include over 100,000 listings that may result from a search for a generic search term. The quantity of listings may reduce the likelihood that a user may find an appropriate good and purchase the good. The current disclosure provides an on-line marketplace with the ability to provide visually guided search refinement for the user. The visually guided search refinement may provide the on-line marketplace with an ability to determine more specifically what a user is searching for and provide more relevant goods for review by the user. In some circumstances, the more relevant the goods the likelihood that the user purchases the goods may increase, thereby increasing the sales of the on-line marketplace.

Modifications, additions, or omissions may be made to the system 100 without departing from the scope of the present disclosure. For example, the interactive system 112 may include additional components and/or networks than those illustrated in or described with respect to FIG. 1. For example, the interactive system 112 may include additional databases, servers, and other computing systems configured to perform other tasks for the interactive system 112.

Figure 2A:
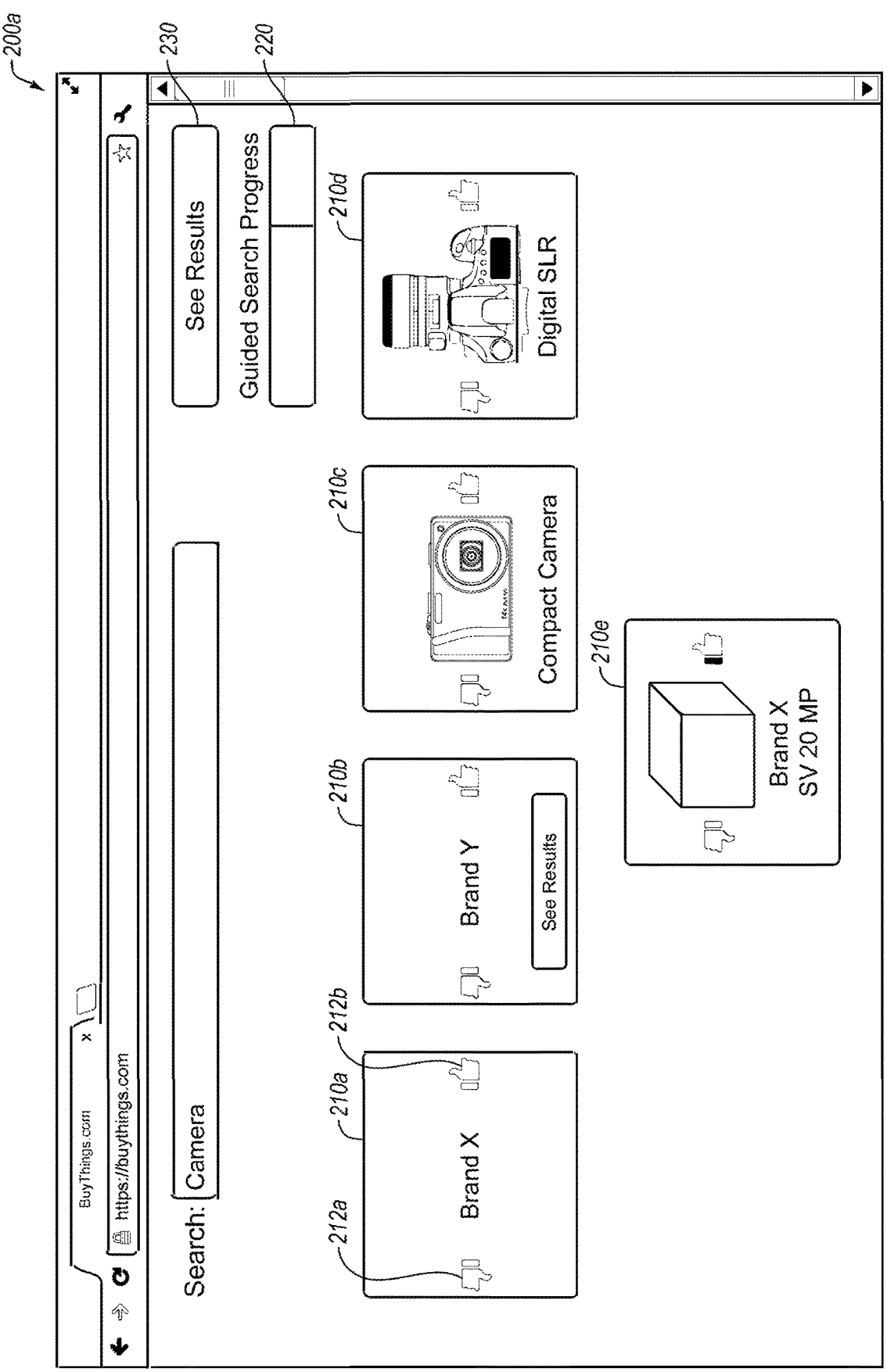
FIG. 2A illustrates an example of a display illustrating visually guided search refinement.

FIG. 2A illustrates an example of a display 200a illustrating visually guided search refinement. The display 200a may be arranged in accordance with at least one embodiment described in the present disclosure. The display 200a may include a web browser or application that is presenting a webpage or interface of an on-line marketplace that provides visually guided search refinement.

The visually guided search refinement may result in the presentation of first, second, third, fourth, and fifth search refinement options 210a, 210b, 210c, 210d, and 210e, referred to herein collectively as the search refinement options 210. The first search refinement option 210a includes a disapproval icon 212a and an approval icon 212b that may be selected by a user through the web browser. Each of the other search refinement options may include a disapproval icon and an approval icon.

As illustrated, a search may have been entered for a "camera." In place of displaying search results, the on-line marketplace may direct the web browser or application to present the search refinement options 210. As illustrated, the search refinement options 210 may be visual cards that are displayed in the web browser or application. The search refinement options 210 may be directed to various search categories and some may include images. For example, the first and second search refinement options 210a and 210b may illustrate brands, the third and fourth search refinement options 210c and 210d may illustrate different categories of types of cameras with corresponding images, and the fifth refinement option 210e may be a specific camera with an image.

Figure 2B:
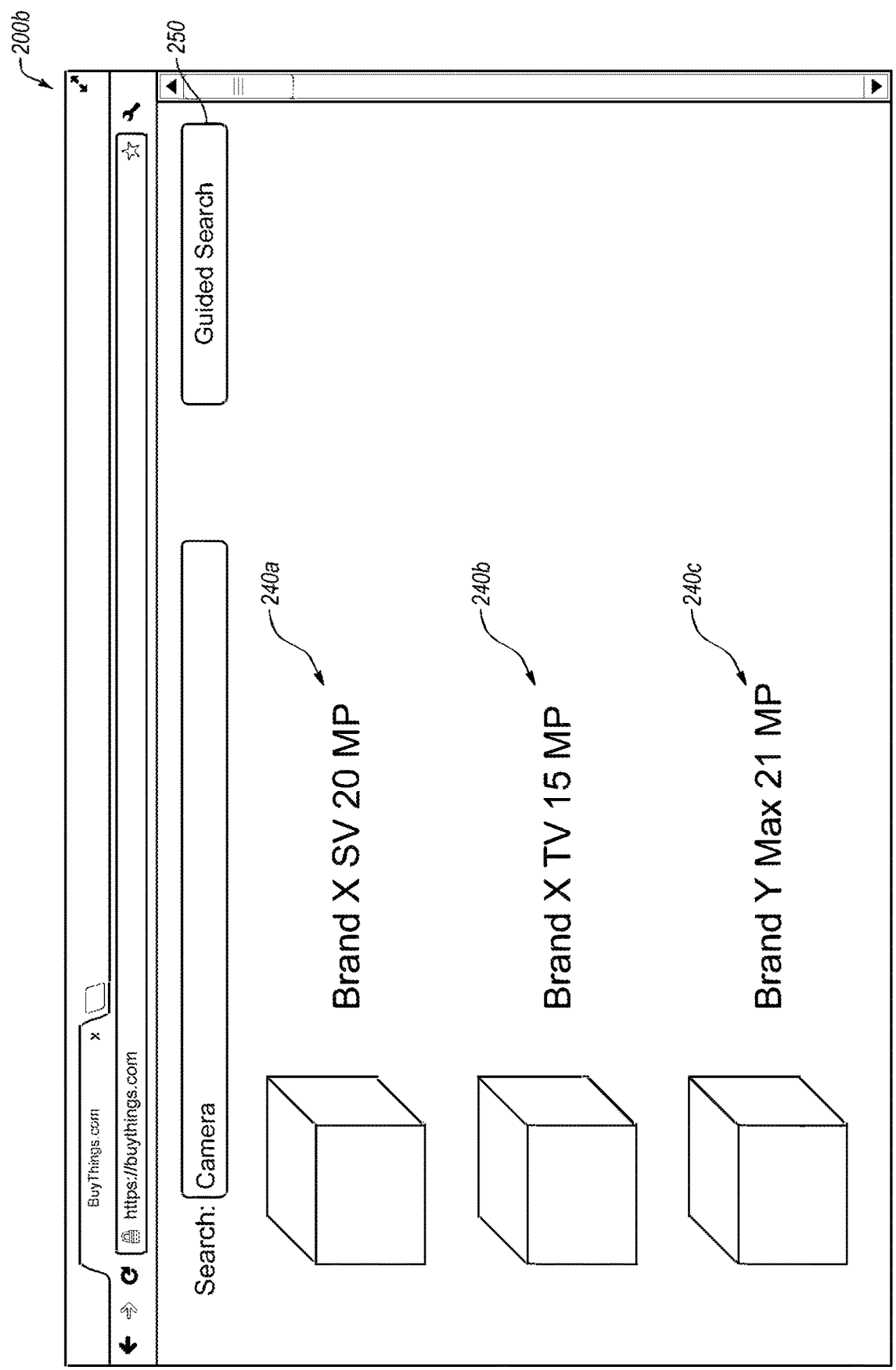
FIG. 2B illustrates an example of a display illustrating search results.

In some embodiments, the on-line marketplace may direct the web browser or application to present a see results tab 230. In these and other embodiments, a user selection of the see results tab 230 may result in the on-line marketplace directing the web browser or application to display search results, such as illustrated in FIG. 2B.

In some embodiments, the on-line marketplace may direct the web browser or application to present a guided search progress tab 220. In these and other embodiments, the guided search progress tab 220 may provide an indication of when the on-line marketplace anticipates that the visually guided search refinement may be complete and search results may be provided to the web browser or application for presentation to a user.

In some embodiments, one or more of the search refinement options 210 may include a see results tab, such as the second search refinement option 210b. In these and other embodiments, the see results tab within one of the search refinement options 210 may cause the on-line marketplace to provide search results based on previous approvals and disapprovals and an implied approval of the one of the search refinement options 210.

Modifications, additions, or omissions may be made to the presentation of the webpage or interface of the on-line marketplace without departing from the scope of the present disclosure. For example, in some embodiments, the webpage or interface of the on-line marketplace may include additional or fewer search refinement options 210. Alternately or additionally, the webpage or interface of the on-line marketplace may include additional or fewer tabs or options than those illustrated.

FIG. 2B illustrates an example of a display 200b illustrating search results. The display 200b may be arranged in accordance with at least one embodiment described in the present disclosure. The display 200b may include a web browser or application that is presenting a webpage or interface with search results from a search of an on-line marketplace.

The display 200b is illustrating first, second, and third search results 240a, 240b, and 240c, referred to herein collectively as "the search results 240." The search results 240 may be results that are provided by the on-line marketplace after providing a guided search refinement. In some embodiments, the display 200b may include a guided search tab 250. In these and other embodiments, a user selection of the guided search tab 250 may result in the on-line marketplace directing the web browser or application to display search refinement options, such as illustrated in FIG. 2A.

As illustrated, the search results 240 may be configured in a different manner from the search refinement options 210 illustrated in FIG. 2. Furthermore, the search results 240 may be for a specific good offered by the on-line marketplace. In contrast, the search refinement options 210 illustrated in FIG. 2, except for the fifth search refinement option 210e illustrated in FIG. 2, may be for categories of goods and not for specific goods offered by the on-line marketplace.

Modifications, additions, or omissions may be made to the presentation of the webpage or interface of the on-line marketplace without departing from the scope of the present disclosure. For example, in some embodiments, the webpage or interface of the on-line marketplace may include additional or fewer search results 240. Alternately or additionally, the webpage or interface of the on-line marketplace may include additional or fewer tabs or options than those illustrated.

Figure 3:
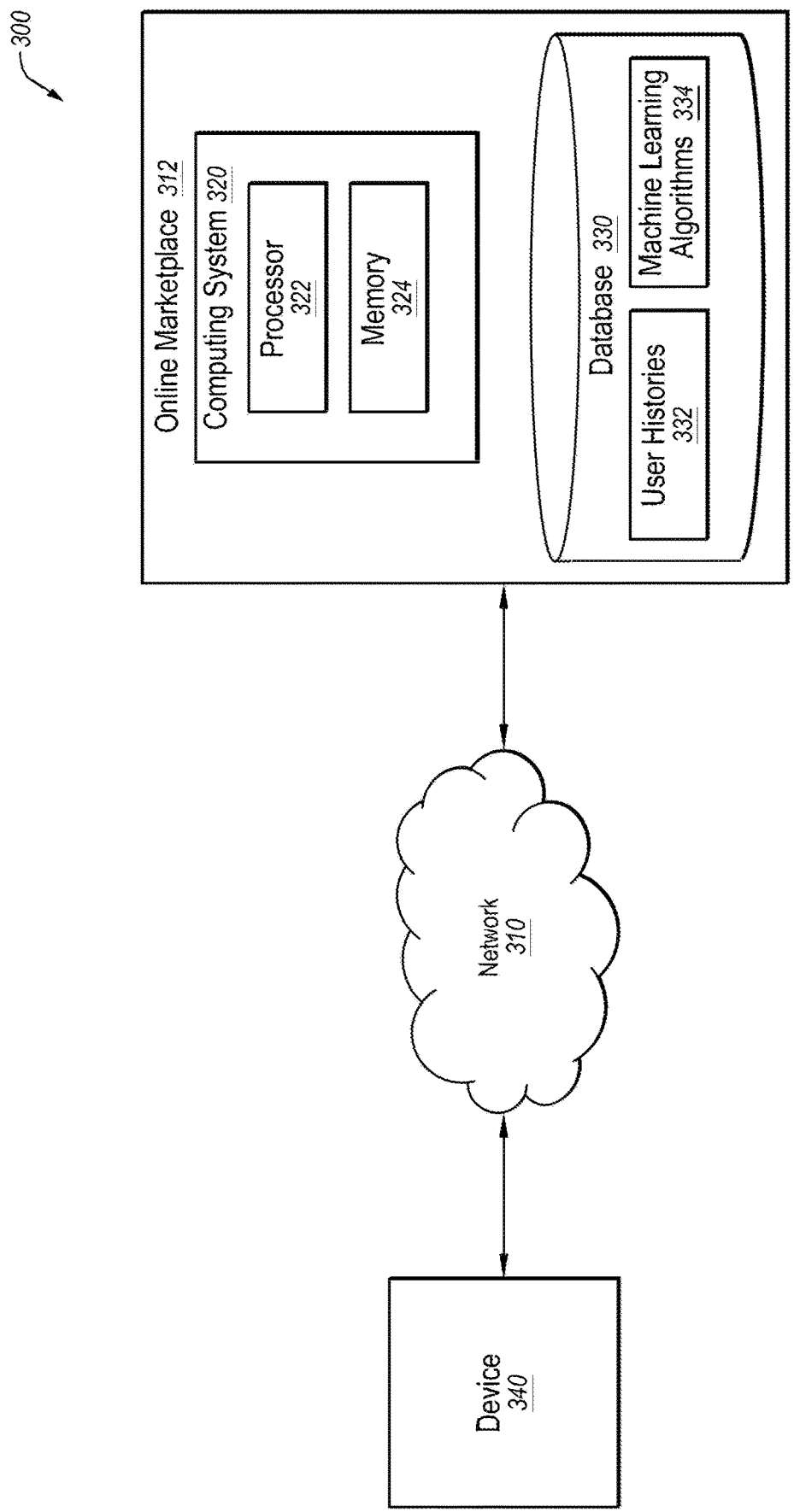
FIG. 3 illustrates another example system configured to perform adaptive search refinement.

FIG. 3 illustrates another example system 300 configured to perform adaptive search refinement. The system 300 may be arranged in accordance with at least one embodiment described in the present disclosure. The system 300 may include a network 310, an online marketplace 312, which includes a computing system 320 and a database 330, and a device 340.

The on-line marketplace 312 may be any configuration of hardware, such as servers and databases, which are configured to provide an on-line marketplace for a seller or sellers to sell goods to buyers. For example, the on-line marketplace 312 may be configured to provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. The prices set for a transaction may be auction-format listing and price setting mechanisms (e.g., English, Dutch, Chinese, Double, Reverse auctions, etc.). Other types of price listing formats may also be used. For example, a fixed-price listing format (e.g., the traditional classified advertisement-type listing or a catalogue listing) or a buyout-type listing format may be used. In these and other embodiments, a buyout-type listing may be offered in conjunction with auction-format listings and allow a buyer to purchase goods or services, which are also being offered for sale via an auction, for a fixed price that is typically higher than a starting price of an auction for an item. In some embodiments, the sellers and/or buyers may access the online marketplace 312 through the network 310 by way of the device 340. For example, a buyer may buy articles by accessing the online marketplace 312 through the device 340. A seller may post articles for sale by accessing the online marketplace 312 through the device 340.

The computing system 320 may be configured to perform adaptive search refinement within the online marketplace 312. In some embodiments, the computing system 320 may include a processor 322 and a memory 324.

In general, the processor 322 may include any suitable special-purpose or general-purpose computer, computing entity, or processing device including various computer hardware or software modules and may be configured to execute instructions stored on any applicable computer-readable storage media. For example, the processor 322 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 322 may include any number of processors configured to perform individually or collectively any number of operations described herein. Additionally, one or more of the processors may be present on one or more different electronic devices, such as different servers. In some embodiments, the processor 322 may interpret and/or execute program instructions and/or process data stored in the memory 324. In some embodiments, the processor 322 may fetch program instructions and load the instructions in the memory 324. After the instructions are loaded into memory 324, the processor 322 may execute the program instructions.

For example, the processor 322 may fetch instructions from the database 330 regarding adaptive search refinement, load the instructions into the memory 324, and execute the instructions to perform the operations described in this disclosure.

The memory 324 may include computer-readable storage media for carrying or having computer-executable instructions or data structures stored thereon. Such computer-readable storage media may be any available media that may be accessed by a general-purpose or special-purpose computer, such as the processor 322. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 322 to perform a certain operation or group of operations.

The database 330 may be communicatively coupled with the computing system 320. The database 330 may include user histories 322 and machine learning algorithms 334. The computing system 320 may access the user histories 322 and the machine learning algorithms 334 from the database 330.

The computing system 320 may be configured to provide visually guided search refinement for a user as the user browses or searches for goods or services offered by the online marketplace 312. In some embodiments, visually guided search refinement may provide a user with one or more visually oriented search refinement options.

In some embodiments, the visually oriented search refinement options may be provided to a user in place of search results in response to an obtained search query. For example, a user may enter a first search query into the device 340. The first search query may be provided to the online marketplace 312 by the network 310. The computing system 320 may be configured to determine when a level of specificity of the first search query is below a search threshold. When the level of specificity of the first search query is below a search threshold, the computing system 320 may provide the user with visually guided search refinement.

In some embodiments, the level of specificity of the first search query may be determined based on a number of words in the first search query. More words in the first search query may indicate that the first search query includes a higher level of specificity. In some embodiments, the search threshold may be based on an average number of words that result in search results that include goods or services that are limited to a particular number of categories of the goods and services offered by the online marketplace 312. In some embodiments, the particular number of categories of the goods and services may be two or fewer. Alternately or additionally, the particular number of categories of the goods and services may be two or fewer sub or leaf categories of the goods and services offered by the online marketplace 312. In some embodiments, the particular number of categories of the goods and services may be based on a conversion data of other users and the user.

In some embodiments, the level of specificity of the first search query may be determined based on a number of categories or leaf categories of the goods and services that result when the first search query is used to search the online marketplace 312. More categories or leaf categories of goods and services that result from searching the first search query may indicate that the first search query includes a lower level of specificity. In some embodiments, the search threshold may be a particular number of categories of the goods and services offered by the online marketplace 312.

In these and other embodiments, the computing system 320 may be configured to continually provide search refinement options and obtain indications of approvals and/or disapprovals of a user of the provided search refinement options until a specificity of a second search query, which is based on the approval and/or disapprovals of the provided search refinement options, is above the search threshold.

In some embodiments, the visually oriented search refinement options may be provided to a user at a request of the user. In these and other embodiments, a user may select visually oriented search refinement options or search results. In these and other embodiments, the user may switch between the visually oriented search refinement options and search results.

In some embodiments, the visually oriented search refinement options may be provided to a user in response to a user engaging with the online marketplace 312. In some embodiments, the user may engage with the online marketplace 312 when the user interacts with the online marketplace 312. The user may interact with the online marketplace 312 when the online marketplace 312 provides information to the device 340 for presentation to the user at the request of the user. Alternately or additionally, the user may engage with the online marketplace 312 when the user performs interactions that may be determined to indicate that the user is shopping for a good or service. In these and other embodiments, the computing system 320 may use machine learning algorithms 334 to determine whether the user interactions may be determined to indicate that the user is shopping for a good or service. For example, a user may be browsing random or pseudo-random goods or services provided by the online marketplace 312. Information regarding the browsing of the user may be provided to the machine learning algorithms 334. The machine learning algorithms 334 may determine if the user is focusing on a certain classification of goods or services. In these and other embodiments, after determining the user is focusing on a certain classification of goods or services, the computing system 320 may provide visually oriented search refinement options to the user based on the certain classification of goods or services to help direct the user to discover a good or service that may be purchased by the user.

In these and other embodiments, the computing system 320 may continue to provide a user with visually oriented search refinement options until the computing system 320 may determine with a confidence level above a particular confidence threshold that the user is going to purchase a good or service. When the confidence level is above the particular confidence threshold, the online marketplace 312 may provide specific goods and/or services for presentation to the user. In some embodiments, the approval and disapprovals from the visually oriented search refinement options may be used to construct a search request. The results of the search request may be the specific goods and/or services provided for presentation to the user.

By providing visually oriented search refinement options, the computing system 320 may guide a user through a browsing experience of the online marketplace 312 to a good or service that may be purchased by the user. In these and other embodiments, the computing system 320 may determine when a confidence level is above a particular confidence threshold based on machine learning algorithms 334. In some embodiments, the user history 332 along with approvals, disapprovals, and non-approvals obtained by the computing system 320 with respect to provided visually oriented search refinement options may be provided to the machine learning algorithms 334. The machine learning algorithms 334 may provide the confidence level. The particular confidence threshold may be based on the user history 332, the categories of the visually oriented search refinement options provided to the user, among other factors. In some embodiments, the machine learning algorithms 334 may be developed based on previous interactions with the online marketplace 312 by the user and other users.

In some embodiments, visually oriented search refinement options provided for presentation to a user may be determined using the machine learning algorithms 334. In these and other embodiments, the user history 332, including past purchases, approvals and disapprovals of particular goods and/or services, among current approvals, disapprovals, and/or non-approvals may be used to determine additional visually oriented search refinement options to provide to a user. For example, the machine learning algorithms 334 and the user history 322 may be used to determine a degree of the non-absolute interpretation applied by the computing system 320. In these and other embodiments, the machine learning algorithms 334 and the user history 322 may be used to determine the additional search terms to include or reject with respect to a non-absolute interpretation. Alternately or additionally, the machine learning algorithms 334 without the user history 322 may be used to determine a degree of the non-absolute interpretation and/or the additional search terms to include or reject.

Modifications, additions, or omissions may be made to the system 300 without departing from the scope of the present disclosure. For example, the computing system 320 and the database 330 may be communicatively coupled by a network, such as the network 110 of FIG. 1. Alternately or additionally, the system 300 may include multiple computing systems 320.

Figure 4:
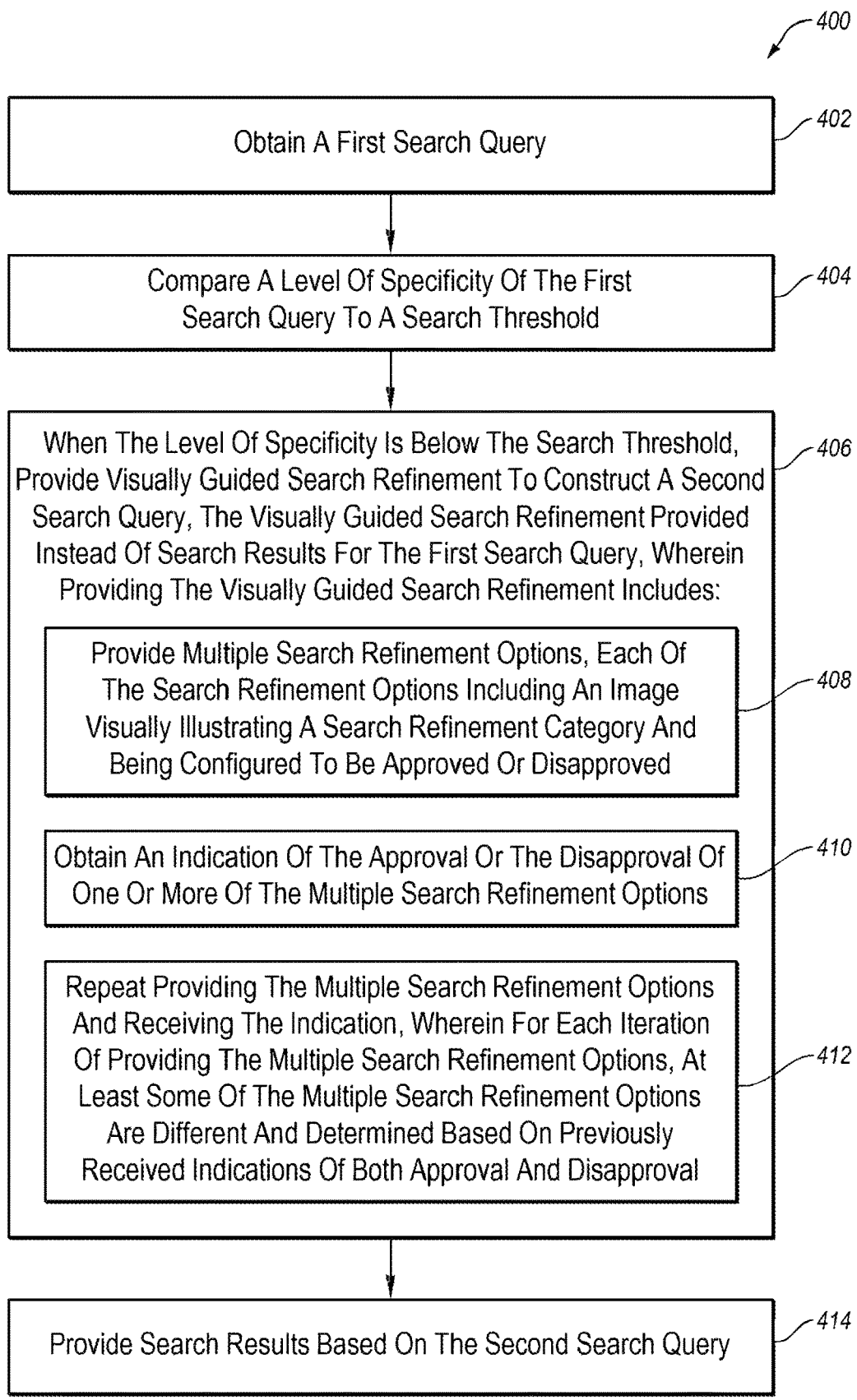
FIG. 4 is a flowchart of an example computer-implemented method for adaptive search refinement.

FIG. 4 is a flowchart of an example computer-implemented method 400 for adaptive search refinement. The method 400 may be arranged in accordance with at least one embodiment described in the present disclosure. The method 400 may be implemented, in some embodiments, by a system, such as the system 100 and/or 300 of FIGS. 1 and 3, respectively. Although illustrated as discrete blocks, various blocks may be divided into additional blocks, combined into fewer blocks, or eliminated, depending on the desired implementation.

The method 400 may begin at block 402, where a first search query may be obtained. In block 404, a level of specificity of the first search query may be compared to a search threshold. In some embodiments, the level of specificity of the first search query may be based on a word count of the first search query or a number of different categories in which products which are found in the search results for the first search query are categorized.

In block 406, when the level of specificity is below the search threshold, visually guided search refinement may be provided to construct a second search query. The visually guided search refinement may be provided instead of search results for the first search query. Providing the visually guided search refinement may include multiple operations, steps, or functions. Some of the operations, steps, or functions to provide a visually guided search refinement may be included in blocks 408, 410, and 412. For example, in block 408, multiple search refinement options may be provided. One or more of the search refinement options may include an image visually illustrating a search refinement category and being configured to be approved or disapproved.

In these and other embodiments, providing the visually guided search refinement may further include providing one or more goods options with the search refinement options. Each of the goods options may include an image visually illustrating a particular good and being configured to be approved or disapproved. Furthermore, in these and other embodiments, each iteration of providing the plurality of search refinement options may be further based on the previously received indications of approval or disapproval of the one or more goods options. Alternately or additionally, search results that are provided to a user may include the goods options with received indications of approval.

In block 410, an indication of the approval or the disapproval of one or more of the multiple search refinement options may be obtained. In block 412, providing the multiple search refinement options and receiving the indication may be repeated. For each iteration of providing the multiple search refinement options at least some of the multiple search refinement options are different and determined based on previously received indications of both approval and disapproval. In some embodiments, providing the multiple search refinement options and receiving the indication is repeated until a level of specificity of the second search query is above the search threshold.

In some embodiments, the multiple search refinement options may be determined based on a non-absolute interpretation and an absolute interpretation of the previously received indications of approval and disapproval. In these and other embodiments, a degree of the non-absolute interpretation of the previously received indications of both approval, non-approval, and disapproval may be based on a number of approvals, non-approvals, and disapprovals for search refinement options in a same search refinement category.

The method 400 may further include block 414 where search results based on the second search query may be provided.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the method 400 may further include obtaining a search results display request and in response to the search results display request, providing the search results based on the second search query before a level of specificity of the second search query is above a search threshold. In these and other embodiments, the method 400 may further include obtaining a visually guided search refinement request and in response to the visually guided search refinement request, providing the visually guided search refinement after providing the search results based on the second search query.

Figure 5:
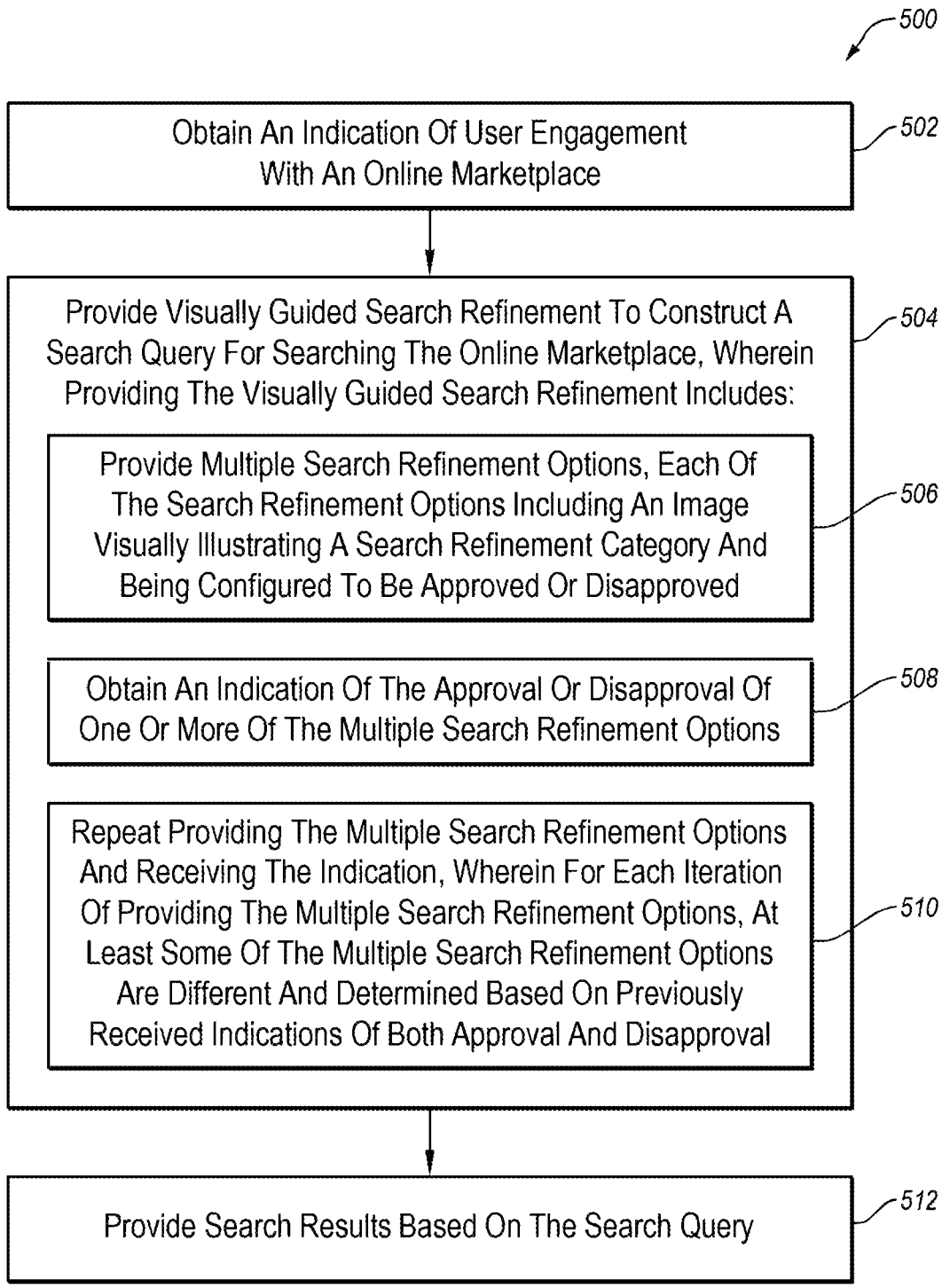
FIG. 5 is a flowchart of another example computer-implemented method for adaptive search refinement.

FIG. 5 is a flowchart of an example computer-implemented method 500 for adaptive search refinement. The method 500 may be arranged in accordance with at least one embodiment described in the present disclosure. The method 500 may be implemented, in some embodiments, by a system, such as the system 100 and/or 300 of FIGS. 1 and 3, respectively. Although illustrated as discrete blocks, various blocks may be divided into additional blocks, combined into fewer blocks, or eliminated, depending on the desired implementation.

The method 500 may begin at block 502, where an indication of user engagement with an online marketplace may be obtained. In block 504, in response to obtaining the indication, visually guided search refinement may be provided to construct a search query for searching the online marketplace. Some of the operations, steps, or functions to provide a visually guided search refinement may be included in blocks 506, 508, and 510. For example, in block 506, multiple search refinement options may be provided. One or more of the search refinement options may include an image visually illustrating a search refinement category and being configured to be approved or disapproved. In block 508, obtaining an indication of the approval or disapproval of one or more of the multiple search refinement options In block 510, providing the multiple search refinement options and receiving the indication may occur repeatedly. In these and other embodiments, for each iteration of providing the multiple search refinement options, at least some of the multiple search refinement options are different and determined based on previously received indications of both approval and disapproval. In some embodiments, the multiple search refinement options may be determined based on a non-absolute interpretation and an absolute interpretation of the previously received indications of approval and disapproval. In some embodiments, a degree of the non-absolute interpretation of the previously received indications of both approval and disapproval may be based on a number of approvals and disapprovals for search refinement options in a same search refinement category.

In some embodiments, providing the multiple search refinement options and receiving the indication is repeated until an output of a preference machine learning model indicates a product preference above a product preference threshold. In these and other embodiments, the output of the preference machine learning model may be based on a past history of a current user, the previously received indications of both approval and disapproval, and interactions with the website by one or more other previous users.

In some embodiments, providing the visually guided search refinement may further include providing one or more goods options with the multiple search refinement options. Each of the goods options may include an image visually illustrating a particular good and being configured to be approved or disapproved. In these and other embodiments, each iteration of providing the multiple search refinement options is further based on the previously received indications of approval or disapproval of the one or more goods options. Furthermore, in some embodiments, the search results may include the goods options with received indications of approval.

In block 512, search results may be provided based on the search query. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 500 may further include obtaining a search results display request in response to the search result display request, providing the search results based on the search query before the output of the preference machine learning model is above the product preference threshold.

In some embodiments, the method 500 may further include obtaining a visually guided search refinement request and in response to the visually guided search refinement request, providing the visually guided search refinement after providing the search results based on the search query.

As indicated above, the embodiments described herein may include the use of a special purpose or general purpose computer (e.g., the processor 322 of FIG. 3) including various computer hardware or software modules, as discussed in greater detail below. Further, as indicated above, embodiments described herein may be implemented using computer-readable media (e.g., the memory 324 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A system for adaptive search refinement, the system comprising:
   one or more processors; and
   one or more computer storage media storing computer-useable instructions that, when executed by the one or more processors, cause the one or more processors to perform operations comprising:
      receiving a first search query;
      generating, based at least in part on the first search query failing to satisfy a threshold level of specificity, a visually guided search refinement comprising one or more search refinement options and one or more approval icons corresponding to the one or more search refinement options;
      receiving one or more indications of approval via the one or more approval icons; and
      generating a second search query based at least in part on the first search query and the received one or more indications.

2. The system of claim 1, the operations further comprising:
   causing presentation of a search result comprising at least one item listing identified based at least in part on the second search query.

3. The system of claim 1, the operations further comprising:
   causing presentation of the one or more search refinement options selected based at least in part on a user history.

4. The system of claim 1, the operations further comprising:
   determining that the first search query does not satisfy the threshold level of specificity based at least in part on a word count of the first search query.

5. The system of claim 1, the operations further comprising:
   determining that the first search query does not satisfy the threshold level of specificity based at least in part on a number of different categories in which products are categorized for search results corresponding to the first search query.

6. The system of claim 1, the operations further comprising:
   iteratively providing one or more additional search refinement options and receiving indications of approval or disapproval for the one or more additional search refinement options until a level of specificity of the second search query satisfies the threshold level of specificity.

7. The system of claim 1, the operations further comprising:
   generating, based at least in part on the first search query failing to satisfy the threshold level of specificity, the visually guided search refinement comprising one or more disapproval icons corresponding to the one or more search refinement options; and
   receiving one or more indications of disapproval via the one or more disapproval icons, wherein the second search query is generated based at least in part on the one or more disapproval icons.

8. A computer implemented method for adaptive search refinement, the method comprising:
- receiving a first search query;
- generating, based at least in part on the first search query failing to satisfy a threshold level of specificity, a visually guided search refinement comprising one or more search refinement options and one or more approval icons corresponding to the one or more search refinement options;
- receiving one or more indications of approval via the one or more approval icons; and
- generating a second search query based at least in part on the first search query and the received one or more indications.

9. The computer implemented method of claim 8, further comprising:
- causing presentation of a search result comprising at least one item listing identified based at least in part on the second search query.

10. The computer implemented method of claim 8, further comprising:
- causing presentation of the one or more search refinement options selected based at least in part on a user history.

11. The computer implemented method of claim 8, further comprising:
- determining that the first search query does not satisfy the threshold level of specificity based at least in part on a word count of the first search query.

12. The computer implemented method of claim 8, further comprising:
- determining that the first search query does not satisfy the threshold level of specificity based at least in part on a number of different categories in which products are categorized for search results corresponding to the first search query.

13. The computer implemented method of claim 8, further comprising:
- iteratively providing one or more additional search refinement options and receiving indications of approval or disapproval for the one or more additional search refinement options until a level of specificity of the second search query satisfies the threshold level of specificity.

14. The computer implemented method of claim 8, further comprising:
- generating, based at least in part on the first search query failing to satisfy the threshold level of specificity, the visually guided search refinement comprising one or more disapproval icons corresponding to the one or more search refinement options; and
- receiving one or more indications of disapproval via the one or more disapproval icons, wherein the second search query is generated based at least in part on the one or more disapproval icons.

15. A non-transitory computer-readable medium storing instructions which, when executed by one or more processors, cause the one or more processors to perform operations comprising:
- receiving a first search query;
- generating, based at least in part on the first search query failing to satisfy a threshold level of specificity, a visually guided search refinement comprising one or more search refinement options and one or more approval icons corresponding to the one or more search refinement options;
- receiving one or more indications of approval via the one or more approval icons; and
- generating a second search query based at least in part on the first search query and the received one or more indications.

16. The non-transitory computer-readable medium of claim 15, wherein the instructions, when executed, further cause the one or more processors to perform operations comprising:
- causing presentation of a search result comprising at least one item listing identified based at least in part on the second search query.

17. The non-transitory computer-readable medium of claim 15, wherein the instructions, when executed, further cause the one or more processors to perform operations comprising:
- causing presentation of the one or more search refinement options selected based at least in part on a user history.

18. The non-transitory computer-readable medium of claim 15, wherein the instructions, when executed, further cause the one or more processors to perform operations comprising:
- determining that the first search query does not satisfy the threshold level of specificity based at least in part on a word count of the first search query.

19. The non-transitory computer-readable medium of claim 15, wherein the instructions, when executed, further cause the one or more processors to perform operations comprising:
- determining that the first search query does not satisfy the threshold level of specificity based at least in part on a number of different categories in which products are categorized for search results corresponding to the first search query.

20. The non-transitory computer-readable medium of claim 15, wherein the instructions, when executed, further cause the one or more processors to perform operations comprising:
- iteratively providing one or more additional search refinement options and receiving indications of approval or disapproval for the one or more additional search refinement options until a level of specificity of the second search query satisfies the threshold level of specificity.

* * * * *